United States Patent
Li et al.

(10) Patent No.: US 10,699,696 B2
(45) Date of Patent: Jun. 30, 2020

(54) METHOD AND APPARATUS FOR CORRECTING SPEECH RECOGNITION ERROR BASED ON ARTIFICIAL INTELLIGENCE, AND STORAGE MEDIUM

(71) Applicant: BEIJING BAIDU NETCOM SCIENCE AND TECHNOLOGY CO., LTD., Haidian District Beijing (CN)

(72) Inventors: Hehan Li, Haidian District Beijing (CN); Wensong He, Haidian District Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 262 days.

(21) Appl. No.: 15/986,273

(22) Filed: May 22, 2018

(65) Prior Publication Data
US 2018/0342233 A1 Nov. 29, 2018

(30) Foreign Application Priority Data
May 23, 2017 (CN) .......................... 2017 1 03670386

(51) Int. Cl.
*G10L 15/01* (2013.01)
*G10L 15/22* (2006.01)
*G10L 15/16* (2006.01)

(52) U.S. Cl.
CPC .............. *G10L 15/01* (2013.01); *G10L 15/16* (2013.01); *G10L 15/22* (2013.01)

(58) Field of Classification Search
CPC ......... G10L 15/01; G10L 15/16; G10L 15/22; G10L 2015/223; G10L 25/51;
(Continued)

(56) References Cited

U.S. PATENT DOCUMENTS

2013/0311182 A1* 11/2013 Kim .................. G10L 15/04
704/240
2014/0163975 A1* 6/2014 Lee .................. G10L 15/01
704/231

FOREIGN PATENT DOCUMENTS

| CN | 103000176 A | 3/2013 |
| CN | 103021412 A | 4/2013 |

(Continued)

OTHER PUBLICATIONS

Chinese Office Action dated Nov. 21, 2019, for related Chinese Appln. No. 201710367038.6; 8 Pages.
(Continued)

*Primary Examiner* — Akwasi M Sarpong
(74) *Attorney, Agent, or Firm* — Brooks Kushman PC

(57) ABSTRACT

The present disclosure provides a method and apparatus for correcting a speech recognition error based on artificial intelligence, and a storage medium, wherein the method comprises: obtaining a second speech recognition result of a second speech query input by the user; performing error-correcting intention recognition according to the second speech recognition result; extracting error-correcting information from the second speech recognition result when it is determined that the user has an error-correcting intention; screening error-correcting resources according to the error-correcting information, and using a selected best-matched error-correcting resource to perform error correction for the first speech recognition result, the first speech recognition result being a speech recognition result of a first speech query which is input before the second speech query. The solution of the present disclosure may be applied to improve accuracy of error-correcting results and reduce the error-correcting difficulty.

15 Claims, 6 Drawing Sheets

(58) Field of Classification Search
CPC ... G10L 15/26; G06F 16/319; G06F 16/3343; G06F 40/30
USPC ............................... 704/254, 240, 257, 231
See application file for complete search history.

(56) References Cited

FOREIGN PATENT DOCUMENTS

| | | |
|---|---|---|
| CN | 105206260 A | 12/2015 |
| CN | 106098060 A | 11/2016 |

OTHER PUBLICATIONS

Chinese Search Report dated Nov. 12, 2019 for related Chinese Appln. No. 2017103670386; 2 Pages.

* cited by examiner

METHOD AND APPARATUS FOR CORRECTING SPEECH RECOGNITION ERROR BASED ON ARTIFICIAL INTELLIGENCE, AND STORAGE MEDIUM

The present application claims the priority of Chinese Patent Application No. 2017103670386, filed on May 23, 2017, with the title of "Method and apparatus for correcting speech recognition error based on artificial intelligence, and storage medium". The disclosure of the above applications is incorporated herein by reference in its entirety.

FIELD OF THE DISCLOSURE

The present disclosure relates to computer application technologies, and particularly to a method and apparatus for correcting a speech recognition error based on artificial intelligence, and a storage medium.

BACKGROUND OF THE DISCLOSURE

Artificial intelligence AI is a new technical science for researching and developing theories, methods, technologies and application systems for simulating, extending and expanding human intelligence. Artificial intelligence is a branch of computer sciences and attempts to learn about the essence of intelligence, and produces a new intelligent machine capable of responding in a manner similar to human intelligence. The studies in the field comprise robots, language recognition, image recognition, natural language processing, expert systems and the like.

As technologies related to speech and natural language processing develop, more and more application scenarios provide a speech manner for interaction with a user.

However, after the user inputs a speech query and when the user's speech query is recognized, an obtained speech recognition result probably includes an error. For example, wrong segments probably appear in a speech recognition result of a longer speech query. When the speech query involves a name of an entity, recognition of the name of the entity probably gets wrong. Or, when the user's input carries an accent, a slip of the tongue or a relatively special customary expression, a recognition error might be caused.

In the prior art, regarding the speech recognition result of the speech query input by the user, calculation may be performed by using background knowledge and a statistics method to find possible wrong places and replace them. However, this error-correcting manner produces a poor error-correcting effect, and errors cannot be recognized under many scenarios. For example, if the user inputs a search object "陈 育娟 (Chinese pronunciation: Chen Yujuan)" through speech query, an error appears in the speech recognition result: "陈育妍 (Chinese pronunciation: Chen Yujuan)" is recognized as "陈玉娟 (Chinese pronunciation: Chen Yujuan)". In this way, the current error-correcting manner cannot be used to correct such errors, and such errors can only be corrected manually by the user, which causes great inconvenience to the user. Particularly, in use of some devices such as wearable or vehicle-mounted devices which are small in size, word input is very inconvenient and therefore the error-correcting difficulty is increased.

It can be seen that use of the current error-correcting manner causes less accurate error-correcting results and increase the error-correcting difficulty.

SUMMARY OF THE DISCLOSURE

In view of the above, the present disclosure provides a method and apparatus for correcting a speech recognition error based on artificial intelligence, and a storage medium, which can improve accuracy of error-correcting results and reduce the error-correcting difficulty.

Specific technical solutions are as follows:

A method for correcting a speech recognition error based on artificial intelligence, comprising:

obtaining a second speech recognition result of a second speech query input by the user;

performing error-correcting intention recognition according to the second speech recognition result;

extracting error-correcting information from the second speech recognition result when it is determined that the user has an error-correcting intention;

screening error-correcting resources according to the error-correcting information, and using a selected best-matched error-correcting resource to perform error correction for the first speech recognition result, the first speech recognition result being a speech recognition result of a first speech query which is input before the second speech query.

According to a preferred embodiment of the present disclosure, the performing error-correcting intention recognition according to the second speech recognition result comprises:

determining whether the second speech recognition result matches at least one of M preset error-correcting intention templates, M being a positive integer;

if yes, determining that the user has the error-correcting intention;

if no, using a deep neural network model to perform intention classification for the second speech recognition result, the classification result including presence of the error-correcting intention and absence of the error-correcting intention.

According to a preferred embodiment of the present disclosure, the extracting error-correcting information from the second speech recognition result comprises:

if it is determined that the user has the error-correcting intention by using the error-correcting intention template, determining the error-correcting information through slot information of the error-correcting intention template;

if it is determined that the user has the error-correcting intention by using the deep neural network model, notating each character in the second speech recognition result through a sequence notation model, and using characters which are notated as belonging to error-correcting information to form the error-correcting information.

According to a preferred embodiment of the present disclosure, when the type of the error-correcting resources are character-dividing resources, the method further comprises:

with respect to each error-correcting resource, respectively converting each character in the error-correcting resource into a corresponding pinyin, and generating a key of the error-correcting resource according to characters and pinyin in the error-correcting resource;

establishing an inverted index between the key and the corresponding error-correcting resource;

the screening error-correcting resources according to the error-correcting information comprises:

converting each character in the error-correcting information into a corresponding pinyin;

determining whether characters in the error-correcting information form a key, and if yes, regarding the error-correcting resource corresponding to the key as a selected error-correcting resource;

determining whether pinyin corresponding to characters in the error-correcting information forms a key, and if yes, regarding the error-correcting resource corresponding to the key as the selected error-correcting resource.

According to a preferred embodiment of the present disclosure, the generating a key of the error-correcting resource comprises:

regarding characters in the error-correcting resource, obtaining a continuous kgram set respectively by taking continuous i terms as a minimum granularity, and regarding pinyin corresponding to characters in the error-correcting resource, obtaining a continuous kgram set respectively by taking i terms as a minimum granularity, wherein i is a positive integer and 2≤i≤N, N being the number of characters included in the error-correcting resource;

regarding characters in the error-correcting resource, obtaining an uncontinuous skipping kgram set respectively by taking continuous j terms as a minimum granularity, and regarding pinyin corresponding to characters in the error-correcting resource, obtaining an uncontinous skipping kgram set respectively by taking j terms as a minimum granularity, wherein j is a positive integer and 2≤j≤N−1.

Elements in the continuous kgram sets and skipping kgram sets are respectively regarded as the keys of the error-correcting resource.

According to a preferred embodiment of the present disclosure, the using a selected best-matched error-correcting resource to perform error correction for the first speech recognition result comprises:

regarding each of the screened-out error-correcting resources, respectively calculating a weighted editing distance between a character string formed by pinyin of characters in the error-correcting resource and a character string formed by pinyin of characters in the error-correcting information;

considering an error-correcting resource with a minimum weighted editing distance obtained from the calculation, as the best-matched error-correcting resource, and using the best-matched error-correcting resource to perform error correction for the first speech recognition result.

According to a preferred embodiment of the present disclosure, when an editing distance is calculated, the editing distance is 1 with regards to both an adding operation and a deleting operation; a pronunciation distance between two syllables is calculated with regard to a replacing operation. The closer the pronunciation distance is, the smaller the generated editing distance increase is.

An apparatus for correcting a speech recognition error based on artificial intelligence, comprising an error-correcting intention recognizing unit, an error-correcting information extracting unit and an error-correcting resource matching unit;

the error-correcting intention recognizing unit is configured to obtain a second speech recognition result of a second speech query input by the user, and perform error-correcting intention recognition according to the second speech recognition result;

the error-correcting information extracting unit is configured to extract error-correcting information from the second speech recognition result when the error-correcting intention recognizing unit recognizes that the user has an error-correcting intention;

the error-correcting resource matching unit is configured to screen error-correcting resources according to the error-correcting information, and use a selected best-matched error-correcting resource to perform error correction for the first speech recognition result, the first speech recognition result being a speech recognition result of a first speech query which is input before the second speech query.

According to a preferred embodiment of the present disclosure, the error-correcting intention recognizing unit determines whether the second speech recognition result matches at least one of M preset error-correcting intention templates, M being a positive integer; if yes, determines that the user has the error-correcting intention; if no, use a deep neural network model to perform intention classification for the second speech recognition result, the classification result including presence of the error-correcting intention and absence of the error-correcting intention.

According to a preferred embodiment of the present disclosure, if the error-correcting intention recognizing unit, using the error-correcting intention template, determines that the user has the error-correcting intention, the error-correcting information extracting unit determines the error-correcting information through slot information of the error-correcting intention template;

if the error-correcting intention recognizing unit, using the deep neural network model, determines that the user has the error-correcting intention, the error-correcting information extracting unit notates each character in the second speech recognition result through a sequence notation model, and uses characters which are notated as belonging to error-correcting information to form the error-correcting information.

According to a preferred embodiment of the present disclosure, the apparatus further comprises a pre-processing unit;

the pre-processing unit is configured to, when the type of the error-correcting resources are character-dividing resources, with respect to each error-correcting resource, respectively convert each character in the error-correcting resource into a corresponding pinyin, and generate a key of the error-correcting resource according to characters and pinyin in the error-correcting resource; establish an inverted index between the key and the corresponding error-correcting resource;

the error-correcting resource matching unit converts each character in the error-correcting information into a corresponding pinyin; determine whether characters in the error-correcting information form a key, and if yes, regard the error-correcting resource corresponding to the key as a selected error-correcting resource; determine whether the pinyin corresponding to characters in the error-correcting information forms a key, and if yes, regard the error-correcting resource corresponding to the key as the selected error-correcting resource.

According to a preferred embodiment of the present disclosure, the pre-processing unit, regarding characters in the error-correcting resource, obtains a continuous kgram set respectively by taking continuous i terms as a minimum granularity, and regarding pinyin corresponding to characters in the error-correcting resource, obtains a continuous kgram set respectively by taking i terms as a minimum granularity, wherein i is a positive integer and 2≤i≤N, N being the number of characters included in the error-correcting resource;

regarding characters in the error-correcting resource, obtains an uncontinuous skipping kgram set respectively by taking continuous j terms as a minimum granularity, and regarding pinyin corresponding to characters in the error-correcting resource, obtains an uncontinuous skipping kgram set respectively by taking j terms as a minimum granularity, wherein j is a positive integer and 2≤j≤N−1.

Elements in the continuous kgram sets and skipping kgram sets are respectively regarded as the keys of the error-correcting resource.

According to a preferred embodiment of the present disclosure, the error-correcting resource matching unit, regarding each of the screened-out error-correcting resources, respectively calculates a weighted editing distance between a character string formed by pinyin of characters in the error-correcting resource and a character string formed by pinyin of characters in the error-correcting information; considers an error-correcting resource with a minimum weighted editing distance obtained from the calculation, as the best-matched error-correcting resource, and uses the best-matched error-correcting resource to perform error correction for the first speech recognition result.

According to a preferred embodiment of the present disclosure, when the error-correcting resource matching unit calculates an editing distance, the editing distance is 1 with regards to both an adding operation and a deleting operation; a pronunciation distance between two syllables is calculated with regard to a replacing operation. The closer the pronunciation distance is, the smaller the generated editing distance increase is.

A computer device, comprising a memory, a processor and a computer program which is stored on the memory and runs on the processor, the processor, upon executing the program, implementing the above-mentioned method.

A computer-readable storage medium on which a computer program is stored, the program, when executed by the processor, implementing the aforesaid method.

As can be seen from the above introduction, the solution of the above embodiment is employed to obtain the second speech recognition result of the second speech query input by the user, perform error-correcting intention recognition according to the second speech recognition result, extract error-correcting information from the second speech recognition result if it is determined that the user has an error-correcting intention, and screen the error-correcting resources according to the error-correcting information, and thereby use a selected best-matched error-correcting resource to perform error correction for the first speech recognition result. A user may describe an error and emphasize correct understanding in a person-to-person dialogue manner. Correspondingly, it is possible to modify the speech recognition result according to the user's description and thereby implement accurate error correction of the speech recognition result, i.e., improve the accuracy of the error-correction result. Furthermore, the user only needs to send an error-correcting instruction in a speech manner and needn't perform manual input operations, thereby lowering the error-correcting difficulty for the user.

DETAILED DESCRIPTION OF PREFERRED EMBODIMENTS

Technical solutions of the present disclosure will be described in more detail in conjunction with figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

Figure 1:
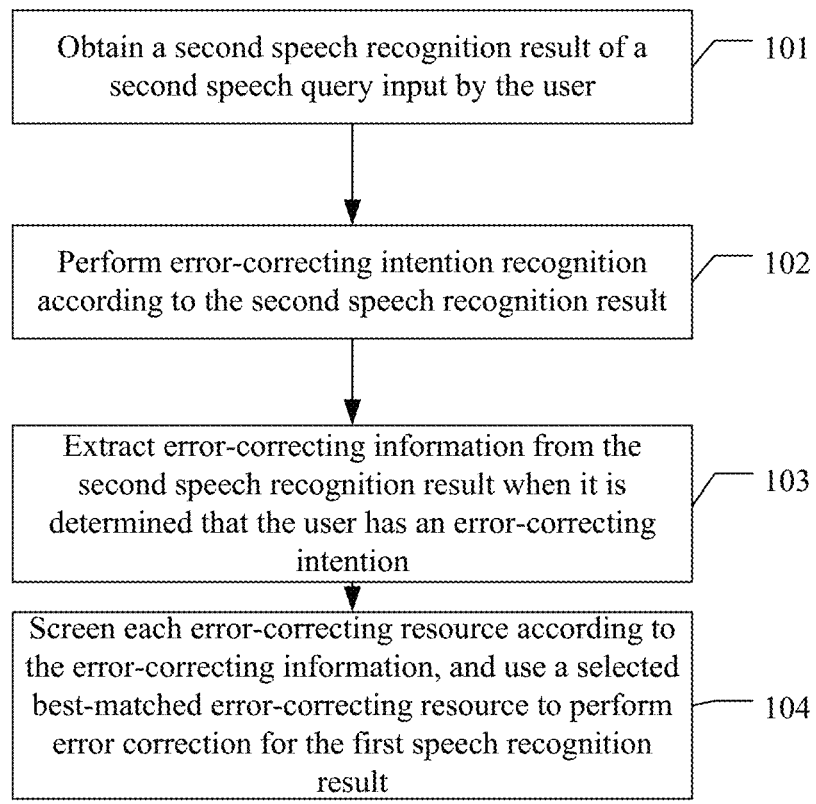
FIG. 1 is a flow chart of an embodiment of a method for correcting a speech recognition error based on artificial intelligence according to the present disclosure.

FIG. 1 is a flow chart of an embodiment of a method for correcting a speech recognition error based on artificial intelligence according to the present disclosure. As shown in FIG. 1, the embodiment comprises the following specific implementation mode.

In 101 is obtained a second speech recognition result of a second speech query input by the user.

In 102, error-correcting intention recognition is performed according to the second speech recognition result.

In 103, error-correcting information is extracted from the second speech recognition result if it is determined that the user has an error-correcting intention.

In 104, error-correcting resources are screened according to the obtained error-correcting information, and a selected best-matched error-correcting resource is used to perform error correction for the first speech recognition result.

Wherein, the first speech recognition result is a speech recognition result of a first speech query which is input before the second speech query.

For example, upon performing search, the user inputs a search object "陈育娟 (Chinese pronunciation: Chen Yujuan)" through a first speech query, an error appears in a first speech recognition result: "陈育娟 (Chinese pronunciation: Chen Yujuan)" is recognized as "陈玉娟 (Chinese pronunciation: Chen Yujuan)", and correspondingly the search result of "陈玉娟 (Chinese pronunciation: Chen Yujuan)" is displayed to the user. In this case, the user may input a second speech query, for example " 下(xia) 面 (mian) 是 (shi) ___ (yi) 个 (ge) 月 (yue) 的 (de) 有 (yu) (English expression: 有 with a 月 below)", thereby performing error correction for the first speech recognition result, and thereby displaying the search result according to the first speech recognition result after the error correction, as shown in FIGS. 2-5.

Figure 2:
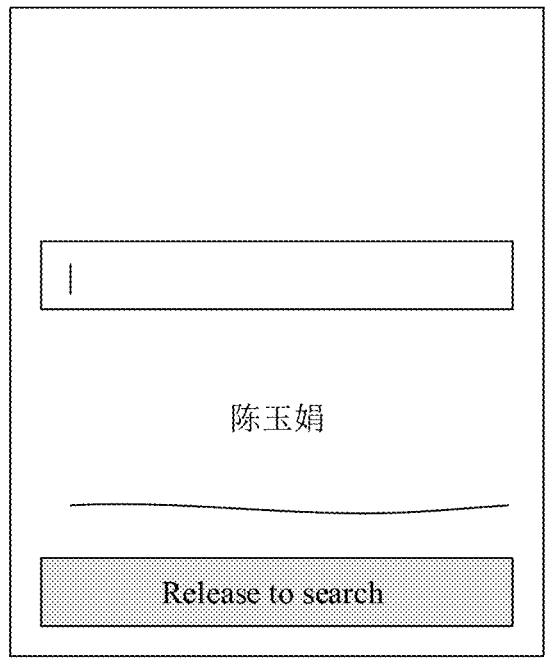
FIG. 2 is a schematic diagram of an input interface of a first speech recognition result "陈玉娟" according to the present disclosure.
Figure 3:
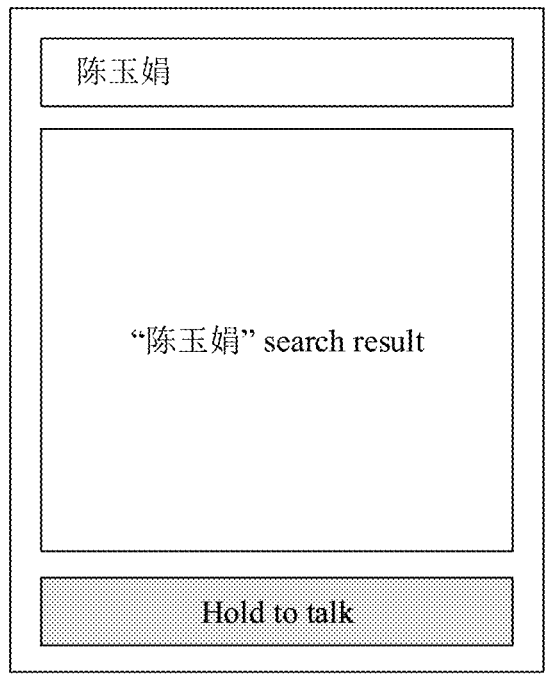
FIG. 3 is a schematic diagram of an interface of a search result corresponding to a first speech recognition result "陈玉娟 (Chinese pronunciation: Chen Yujuan)" according to the present disclosure.
Figure 4:
FIG. 4 is a schematic diagram of an input interface of a second speech recognition result "下(xia)面(mian)足(shi)一(yi)个(ge)月(yue)的(de)育(yu) (English expression: 育 with a 月 below)" according to the present disclosure.
Figure 5:
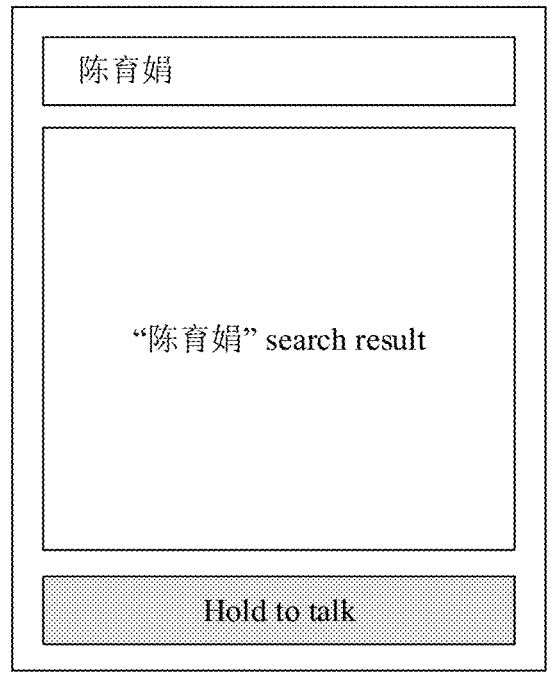
FIG. 5 is a schematic diagram of an interface of a search result corresponding to a corrected first speech recognition result "陈育娟 (Chinese pronunciation: Chen Yujuan)" according to the present disclosure.

FIG. 2 is a schematic diagram of an input interface of a first speech recognition result "陈玉娟 (Chinese pronunciation: Chen Yujuan)" according to the present disclosure, FIG. 3 is a schematic diagram of an interface of a search result corresponding to a first speech recognition result " 陈玉娟 (Chinese pronunciation: Chen Yujuan)" according to the present disclosure, FIG. 4 is a schematic diagram of an input interface of a second speech recognition result " 下(xia) 面 (mian) 是(shi) 一 (yi) 个 (ge) 月 (yue) 的 (de) 有 (yu) (English expression: 有 with a 月 below)" according to the present disclosure, and FIG. 5 is a schematic diagram of an interface of a search result corresponding to a corrected first speech recognition result " 陈 育 娟 (Chinese pronunciation: Chen Yujuan)" according to the present disclosure.

It can be seen that in the embodiment shown in FIG. 1 is proposed an interaction type speech recognition error-correcting manner based on multiple rounds of dialogue. The whole error-correcting process is mainly divided into three phases: error-correcting intention recognition, error-correcting information extraction and error-correcting resource matching. Through the three phases, information provided by the user in the speech query is progressively judged, mined and used to help the user to achieve the error-correcting intention.

Specific implementations of the abovementioned phases are described respectively in detail.

1) Error-Correcting Intention Recognition

It is feasible to, after receiving the user-input second speech query, first perform speech recognition for it according to the prior art to obtain the second speech recognition result.

Then, it is feasible to perform error-correcting intention recognition according to the second speech recognition result, namely, determine whether the user has an error-correcting intention, and perform a subsequent error-correcting process after the user is determined as having the error-correcting intention.

Different users might employ different expression manners: some expression manners are relatively definite so that the user's error-correcting intention can be easily recognized; some expression manners are more complicated so that recognition is hard to perform. Hence, the present embodiment provides two recognition manners, namely, rule-based error-correcting intention recognition manner and statistics-based error-correcting recognition manner. The two manners may be used in combination.

The rule-based error-correcting intention recognition manner may refer to pre-generating M error-correcting intention templates, wherein M is a positive integer whose specific value depends on actual needs and is usually larger than 1. As such, after the second speech recognition result is obtained, it is feasible to determine whether it matches at least one of the M error-correcting intention templates, and, if yes, determines that the user has the error-correcting intention.

Second speech recognition results and error-correcting intention templates are as shown in Table 1:

TABLE 1

Second speech recognition results and error-correcting intention templates

| Examples of templates | Second speech recognition results |
|---|---|
| 是 (shi) [偏(pian)旁(pang)] 的(de)[字 (zi)] (English expression: [character] with a [radical]) | 我(wo)要(yao)的(de)是(shi)单(dan) 人 (ren)旁(pang)的(de)倒(dao) (English expression: I want the character 倒 with the radical 亻 ) |
| 是 (shi) [声(sheng)调(diao)]的(de)那(na) 个 (ge)[字 (zi)] (English expression: [character] with a [tone]) | 是(shi)三(san)声(sheng)的(de)那(na) 个 (ge)倒(dao) (English expression: The character 倒 with a falling-rising tone) |

If the second speech recognition result fails to match any of the error-correcting intention templates, the statistics-based error-correcting intention recognition manner may be employed to recognize the second speech recognition result.

For example, a deep neural network model may be used to perform intention classification for the second speech recognition result. The classification result includes presence of the error-correcting intention and absence of the error-correcting intention.

Figure 6:
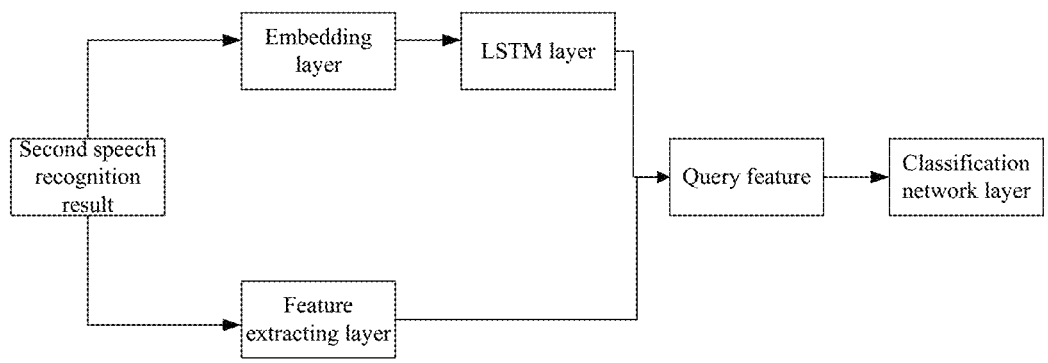
FIG. 6 is a block diagram of a deep neural network model according to the present disclosure.

FIG. 6 is a block diagram of the deep neural network model according to the present disclosure. As shown in FIG. 6, it is possible to employ a manner combining a word vector feature and a statistics feature, use embedding and Long Short Term Memory Networks (LSTM) to respectively obtain the word vector of each character in the second speech recognition result, develop feature engineering with respect to each character in the second speech recognition result to extract the statistic feature. The two are combined to determine an intention classification result. The classification result includes presence of the error-correcting intention and absence of the error-correcting intention.

Which specific statistics features are extracted may depend on actual needs. For example, the statistics features may include pinyin features, pronunciation distance features and rule features.

2) Error-Correcting Information Extraction

After it is determined that the user has an error-correcting intention, it is impossible to directly use the second speech recognition result to perform error correction for the first speech recognition result because the second speech recognition result includes error-correcting information as well as other noise information. Hence, it is necessary to extract useful error-correcting information, remove irrelevant information and then complete subsequent error-correcting processing.

As a different recognition manner is employed when error-correcting intention recognition is performed for the second speech recognition result, a manner of extracting error-correcting information from the second speech recognition result is different.

Wherein, if an error-correcting intention template is used to determine that the user has an error-correcting intention, the error-correcting information may be directly extracted through slot information of the error-correcting intention template.

For example, the second speech recognition result is " 我(wo)要(yao)的(de)是(shi) 单(dan)人(ren)旁(pang) 的(de)倒(dao) (English expression: I want the character 倒 with the radical 亻)", the matched error-correcting intention template is "是(shi)偏(pian)旁(pang)的(de)字(zi)] (English expression: [character] with a [radical])", and then extracted error-correcting information is [偏(pian)旁(pang): 单(dan)人(ren)旁(pang)] (English expression: [radical: 亻]) and [字(zi): 倒(dao)] (English expression: [character: 倒]).

If a deep neural network model is used to determine that the user has an error-correcting intention, it is possible to, through a sequence notation model, notate each character in the second speech recognition result, and use characters which are notated as belonging to error-correcting information to form the error-correcting information.

That is, the sequence notation model is used to notate different class information in the second speech recognition result, thereby determining useful information. Different from conventional Named Entity Recognition (NER) sequence notation, the notation for the second speech recognition result is performed with a word granularity, so the difficulty is larger and the requirement for precision is higher.

Figure 7:
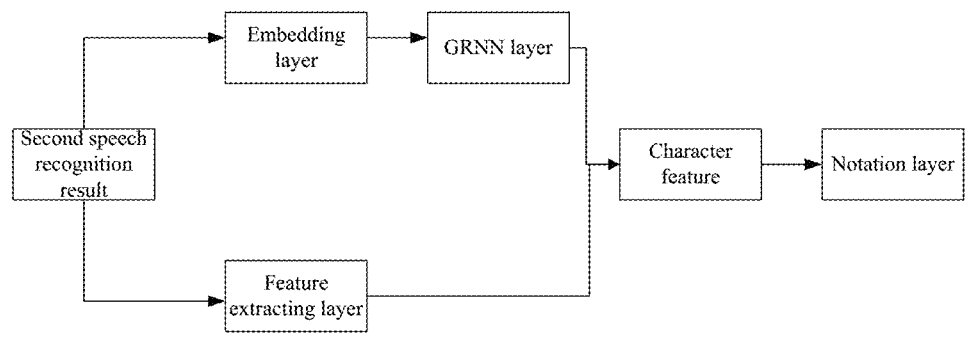
FIG. 7 is a block diagram of a sequence notation model according to the present disclosure.

FIG. 7 is a block diagram of a sequence notation model according to the present disclosure. As shown in FIG. 7, each character in the second speech recognition result is notated in a manner combining a word vector feature and a statistics feature. Regarding the word vector, experiments show that a better effect is achieved by employing a General Regression Neural Network (GRNN). The feature engineering generates a statistics feature for each character, the statistic feature and the word vector of each character is merged to obtain a character feature, and then the notation is performed via a fully-connected neural network. Regarding each character, it can reflect the error-correcting information or cannot reflect the error-correcting information, namely, belong to the error-correcting information or not belong to the error-correcting information, and characters capable of reflecting the error-correcting information are used to form the desired error-correcting information.

For example, the character " 单(dan)" in "我(wo)要(yao) 的(de)是(shi)单(dan)人(ren)旁(pang)的(de)倒(dao)" is used to describe a component of the character, so it can reflect the error-correcting information.

3) Error-Correcting Resource Matching

After the error-correcting information is obtained, the error-correcting information may be used to match with error-correcting resources to determine an object descried by the error-correcting information, namely, the character that the user wants to find by describing.

There are many types of error-correcting resources, for example, character radical resources and character-dividing resources are used. The character radical resources refer to kv pairs of (偏(pian)旁(pang): 字(zi)) (English expression: (radical: character)), e.g., (单(dan)人(ren)旁(pang): 倒(dao))(亻:倒); the character-dividing resources describe division information of the character and the original character, e.g., (人(ren)到(dao): 倒(dao)).

The character-dividing resources are taken as an example to illustrate how to screen the error-correcting resources according to the error-correcting information, and use the selected best-matched error-correcting resource to perform error correction for the first speech recognition result.

Since the query is the speech query, it is impossible to index resources directly through words information. Since the second speech recognition result might include errors, for example, " 人(ren)到(dao): 倒(dao)" is recognized as " 人(ren)道(dao): 倒(dao)" or " 人(ren)到(dao): 到(dao)", it is necessary to convert into corresponding pinyin to solve recognition error problems in the second speech recognition result.

In addition, other problems might exist. For example, regarding the error-correcting resource (日(ri)四(si)又(you): 曼(man)), the second speech recognition result might be " 上(shang)而(mian)是(shi)四(si)字(zi)下(xia)而(mian) 又(you)的(de)那(na)个(ge)曼(man) (English expression: 曼 with 四 above 又)", and the extracted error-correcting information is [四(si)又(you): 曼(man)]. Hence, it is necessary to calculate a similarity between the error-correcting information and the error-correcting resources, and obtain the error-correcting resource with the highest similarity as a final matching result. However, calculation of the linear similarity consumes too much time and cannot be accepted. Hence, it is proposed in the present embodiment that inverted zippering may be performed for error-correcting resources according to a kgram set of a key, thereby reducing the similarity computing workload.

To this end, it is feasible, with respect to each error-correcting resource, respectively convert each character in the error-correcting resource into a corresponding pinyin, and generate a key of the error-correcting resource according to characters and pinyin in the error-correcting resource, the key being a kgram key, and thereby establish an inverted index between the key and the corresponding error-correcting resource.

As such, the error-correcting resources are screened according to the error-correcting information, it is possible to first convert each character in the error-correcting information into a corresponding pinyin, then determine whether characters in the error-correcting information form a key, and if yes, regard the error-correcting resource corresponding to the key as the selected error-correcting resource, and determine whether the pinyin corresponding to characters in the error-correcting information forms a key, and if yes, regard the error-correcting resource corresponding to the key as the selected error-correcting resource.

Specifically, the key of the error-correcting resource may be determined in the following manner with respect to each error-correcting resource.

Regarding characters in the error-correcting resource, a continuous kgram set is obtained respectively by taking continuous i terms as a minimum granularity, and regarding pinyin corresponding to characters in the error-correcting resource, a continuous kgram set is obtained respectively by taking i terms as a minimum granularity, wherein i is a positive integer and 2≤i≤N, N being the number of characters included in the error-correcting resource;

Regarding characters in the error-correcting resource, an uncontinuous skipping kgram set is obtained respectively by taking continuous j terms as a minimum granularity, and regarding pinyin corresponding to words in the error-correcting resource, an uncontinous skipping kgram set is obtained respectively by taking j terms as a minimum granularity, wherein j is a positive integer and 2≤j≤N−1.

Elements in the continuous kgram sets and skipping kgram sets are respectively regarded as the keys of the error-correcting resource.

Take an example:

Assuming that the error-correcting resource is (日(ri)四(si)又(you):曼(man));

The continuous kgram set obtained by taking continuous two terms as a minimum granularity is {日(ri)四(si), 四(si)又(you), 又(you)曼(man)};

The continuous kgram set obtained by taking continuous three terms as a minimum granularity is {日(ri)四(si)又(you), 四(si)又(you)曼(man)};

The continuous kgram set obtained by taking continuous four terms as a minimum granularity is {日(ri)四(si)又(you)曼(man)};

The uncontinuous skipping kgram set obtained by taking two terms as a minimum granularity is {日(ri)又(you), 日(ri)曼(man), 四(si)曼(man)}; The uncontinuous skipping kgram set obtained by taking three terms as a minimum granularity is {日(ri)又(you)曼(man), 日(ri)四(si)曼(man)};

Correspondingly, regarding pinyin (ri'si'you:man) of the error-correcting resource;

The continuous kgram set obtained by taking continuous two terms as a minimum granularity is ri, si, si'you, you'man};

The continuous kgram set obtained by taking continuous three terms as a minimum granularity is {ri'si'you, si'you'man};

The continuous kgram set obtained by taking continuous four terms as a minimum granularity is {ri'si'you 'man};

The uncontinuous skipping kgram set obtained by taking two terms as a minimum granularity is {ri'you, ri'man, si'man};

The uncontinuous skipping kgram set obtained by taking three terms as a minimum granularity is {ri'you'man, ri'si'man};

Elements in the continuous kgram sets and skipping kgram sets all are the keys of the error-correcting resource (日(ri)四(si)又(you):曼(man)). A list obtained by drawing through any key includes the error-correcting resource (日(ri)四(si)又(you):曼(man)), for example, "日(ri)四(si)" is a key, "四(si)又(you)曼(man)" is also a key, the list obtained by drawing through "日(ri)四si)" includes the error-correcting resource (日(ri)四(si)又(you):曼(man)), and likewise, the list obtained by drawing through "四(si)又(you)曼(man)" also includes the error-correcting resource (日(ri)四(si)又(you):曼(man)).

Assume that the second speech recognition result might be "上(shang)面(mian)是(shi)四(si)字(zi)下(xia)面(mian)又(you)的(de)那(na)个(ge)曼(man) (曼 with 四 above 又)" and the extracted error-correcting information is [四(si)又(you):曼(man)], two keys can be formed according to the error-correcting information: "四又曼" and "si'you'man", the error-correcting resources corresponding to the two keys "四又曼" and "si'you'man" are regarded as the screened-out error-correcting resources, which include the error-correcting resource (日(ri)四(si)又(you):曼(man)) or may also include other error-correcting resources.

Then, it is feasible to further select, from the screened-out error-correcting resources, an error-correcting resource which is best matched with the error-correcting information, and use the selected best-matched error-correcting resource to perform error correction for the first speech recognition result.

Specifically, it is feasible, regarding each of the screened-out error-correcting resources, to respectively calculate a weighted editing distance between a character string formed by pinyin of characters in the error-correcting resource and a character string formed by pinyin of characters in the error-correcting information, consider the error-correcting resource with a minimum weighted editing distance obtained from the calculation, as the best-matched error-correcting resource, and use the best-matched error-correcting resource to perform error correction for the first speech recognition result.

The editing distance refers to the smallest times of editing operations of transforming one character string to the other character string between two character strings. Permissible editing operations include replacing one character with another character, adding (inserting) a character, and deleting a character. Generally, the similarity of the two character strings is larger when the editing distance is smaller.

In the present embodiment, when the editing distance is calculated, the editing distance is the same as the conventional editing distance measurement manner and is 1 with regards to the adding operation and the deleting operation; a pronunciation distance between two syllables may be calculated with regard to the replacing operation. The closer the pronunciation distance is, the smaller the generated editing distance increase is.

The above describes how to screen the error-correcting resources according to the error-correcting information and use the selected best-matched error-correcting resource to perform error correction for the first speech recognition result by taking character-dividing resource as an example of the error-correcting resource. The solution of the present disclosure also applies to other types of error-correcting resources, and the only thing is that specific implementations might be somewhat different.

For example, regarding character radical resources, each character in each error-correcting resource may be converted into corresponding pinyin. Assume that the error-correcting information is (亻:倒), it is also feasible to convert each character in the error-correcting information into corresponding pinyin, and according to the pinyin, look for the error-correcting resource which is completely matched with the error-correcting information. If there is only one error-correcting resource, the error-correcting resource is the best-matched error-correcting resource. If there are multiple error-correcting resources, the best-matched error-correcting resource may be further selected from the multiple error-correcting resources in a predetermined manner, for example, according to use frequency, contextual information or the like.

In addition, error correction may be performed through words, tones or the like.

For example, the user-input first speech query is "李烁 (Chinese pronoucation: li shuo)", the first speech recognition result gets wrong in recognizing "李烁 (Chinese pronoucation: li shuo)" into "李树 (Chinese pronoucation: li shu)", and then the user may further input the second speech query " 烁(di)的(er)烁(ge)第(zi)一(shi)个(shan) 字(shuo) 是(de)闪(shuo) (English expression: the second character is " 烁" as in "闪 烁")" to perform error correction for the first speech recognition result.

To sum up, the solution of the above embodiment may be employed to obtain the second speech recognition result of the second speech query input by the user, perform error-correcting intention recognition according to the second speech recognition result, extract error-correcting information from the second speech recognition result if it is determined that the user has an error-correcting intention, and screen the error-correcting resources according to the error-correcting information, and thereby use a selected best-matched error-correcting resource to perform error correction for the first speech recognition result. A user may describe an error and emphasize correct understanding in a person-to-person dialogue manner. Correspondingly, it is possible to modify the speech recognition result according to the user's description and thereby implement accurate error correction of the speech recognition result, i.e., improve the accuracy of the error-correction result. Furthermore, the user only needs to send an error-correcting instruction in a speech manner and needn't perform manual input operations, thereby lowering the error-correcting difficulty for the user.

In addition, the solution of the above embodiment may be employed to convert the error-correcting information into pinyin to screen the error-correcting resources to try to ensure that error correction can still be performed for the first speech recognition result when an error appears in the second speech recognition result.

Furthermore, the solution of the above embodiment may be employed to establish an inverted index through the kgram set for the error-correcting resources, thereby reducing the similarity computing workload and saving the computing resources.

The above introduces the method embodiments. The solution of the present disclosure will be further described through an apparatus embodiment.

Figure 8:
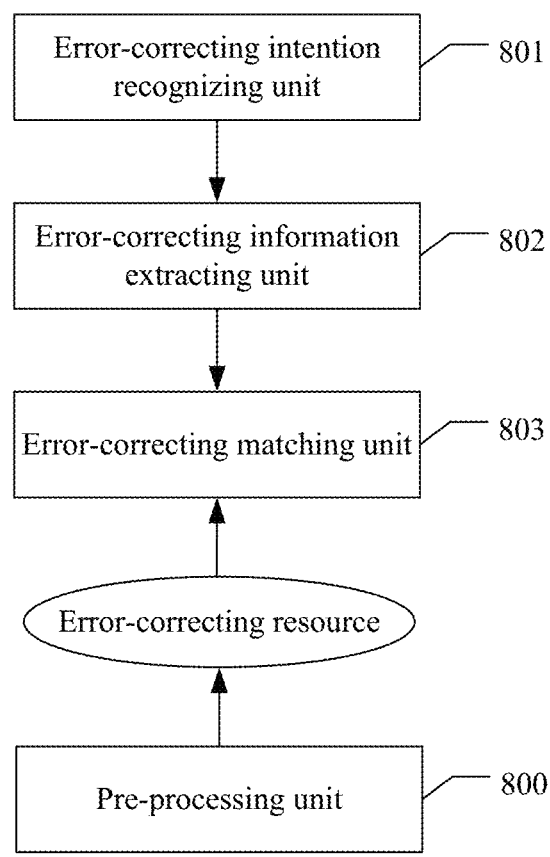
FIG. 8 is a block diagram of an embodiment of an apparatus for correcting a speech recognition error based on artificial intelligence according to the present disclosure.

FIG. 8 is a block diagram of an embodiment of an apparatus for correcting a speech recognition error based on artificial intelligence according to the present disclosure. As shown in FIG. 8, the apparatus comprises an error-correcting intention recognizing unit 801, an error-correcting information extracting unit 802 and an error-correcting resource matching unit 803.

The error-correcting intention recognizing unit 801 is configured to obtain a second speech recognition result of a second speech query input by the user, and perform error-correcting intention recognition according to the second speech recognition result.

The error-correcting information extracting unit 802 is configured to extract error-correcting information from the second speech recognition result when the error-correcting intention recognizing unit 801 recognizes that the user has an error-correcting intention.

The error-correcting resource matching unit 803 is configured to screen error-correcting resources according to the error-correcting information, and use a selected best-matched error-correcting resource to perform error correction for the first speech recognition result, the first speech recognition result being a speech recognition result of a first speech query which is input before the second speech query.

The error-correcting intention recognizing unit 801 may, after receiving the user-input second speech query, first perform speech recognition for it according to the prior art to obtain the second speech recognition result.

Then, the error-correcting intention recognizing unit 801 may perform error-correcting intention recognition according to the second speech recognition result, namely, determine whether the user has an error-correcting intention, and perform a subsequent error-correcting process after the user is determined as having the error-correcting intention.

Different users might employ different expression manners: some expression manners are relatively definite so that the user's error-correcting intention can be easily recognized; some expression manners are more complicated so that recognition is hard to perform. Hence, the present embodiment provides two recognition manners, namely, rule-based error-correcting intention recognition manner and statistics-based error-correcting recognition manner. The two manners may be used in combination.

The rule-based error-correcting intention recognition manner may refer to pre-generating M error-correcting intention templates, wherein M is a positive integer whose specific value depends on actual needs and is usually larger than 1. As such, after the error-correcting intention recognizing unit 801 obtains the second speech recognition result, it is feasible to determine whether it matches at least one of the M error-correcting intention templates, and, if yes, determines that the user has the error-correcting intention.

If the second speech recognition result fails to match any of the error-correcting intention templates, the statistics-based error-correcting intention recognition manner may be further employed to recognize the second speech recognition result.

For example, the error-correcting intention recognizing unit 801 may use a deep neural network model to perform intention classification for the second speech recognition result. The classification result includes presence of the error-correcting intention and absence of the error-correcting intention.

The framework of the deep neural network model may be as shown in FIG. 6.

After it is determined that the user has an error-correcting intention, it is impossible to directly use the second speech recognition result to perform error correction for the first speech recognition result because the second speech recognition result includes error-correcting information as well as other noise information. Hence, it is necessary to extract useful error-correcting information, remove irrelevant information and then complete subsequent error-correcting processing.

As a different recognition manner is employed when error-correcting intention recognition is performed for the second speech recognition result, a manner of extracting error-correcting information from the second speech recognition result is different.

Wherein, if the error-correcting intention recognizing unit 801 uses an error-correcting intention template to determine that the user has an error-correcting intention, the error-correcting information extracting unit 802 may determine the error-correcting information through slot information of the error-correcting intention template.

If the error-correcting intention recognizing unit 801 uses the deep neural network model to determine that the user has an error-correcting intention, the error-correcting information extracting unit 802 may, through a sequence notation model, notate each character in the second speech recognition result, and use characters which are notated as belonging to error-correcting information to form the error-correcting information.

The framework of the sequence notation model may be as shown in FIG. 7.

After the error-correcting information is obtained, the error-correcting information may be used to match with error-correcting resources to determine an object descried by the error-correcting information, namely, the character that the user wants to find by describing.

There are many types of error-correcting resources, for example, character radical resources and character-dividing resources are used. The character radical resources refer to kv pairs of (偏(pian) 旁 (pang): 字 (zi)) (English expression: (radical: character)), e.g., (单(dan) 人 (ren) 旁 (pang): 倒(dao)) (亻:倒); the character-dividing resources describe division information of the character and the original character, e.g., (人(ren)刂(dao): 倒 (dao)).

The character-dividing resources are taken as an example to describe the specific operation manner of the error-correcting resource matching unit 803.

Correspondingly, as shown in FIG. 8, the apparatus of the present embodiment may further comprise a pre-processing unit 800.

The pre-processing unit 800 is configured to, when the type of the error-correcting resources are character-dividing resources, with respect to each error-correcting resource, respectively convert each character in the error-correcting resource into a corresponding pinyin, and generate a key of the error-correcting resource according to characters and pinyin in the error-correcting resource, and establish an inverted index between the key and the corresponding error-correcting resource.

The error-correcting resource matching unit 803 may convert each character in the error-correcting information into a corresponding pinyin; determine whether characters in the error-correcting information form a key, and if yes, regard the error-correcting resource corresponding to the key as the selected error-correcting resource; determine whether the pinyin corresponding to characters in the error-correcting information forms a key, and if yes, regard the error-correcting resource corresponding to the key as the selected error-correcting resource.

Specifically, the pre-processing unit 800 may determine the key of the error-correcting resource in the following manner with respect to each error-correcting resource:

regarding characters in the error-correcting resource, obtaining a continuous kgram set respectively by taking continuous i terms as a minimum granularity, and regarding pinyin corresponding to characters in the error-correcting resource, obtaining a continuous kgram set respectively by taking i terms as a minimum granularity, wherein i is a positive integer and 2≤i≤N, N being the number of characters included in the error-correcting resource;

regarding characters in the error-correcting resource, obtaining an uncontinuous skipping kgram set respectively by taking continuous j terms as a minimum granularity, and regarding pinyin corresponding to characters in the error-correcting resource, obtaining an uncontinous skipping kgram set respectively by taking j terms as a minimum granularity, wherein j is a positive integer and 2≤j≤N−1.

Elements in the continuous kgram sets and skipping kgram sets are respectively regarded as the keys of the error-correcting resource.

Then, the error-correcting resource matching unit 803 may further select, from the screened-out error-correcting resources, an error-correcting resource which is best matched with the error-correcting information, and use the selected best-matched error-correcting resource to perform error correction for the first speech recognition result.

Specifically, the error-correcting resource matching unit 803 may, regarding each of the screened-out error-correcting resources, respectively calculate a weighted editing distance between a character string formed by pinyin of characters in the error-correcting resource and a character string formed by pinyin of characters in the error-correcting information; consider the error-correcting resource with a minimum weighted editing distance obtained from the calculation, as the best-matched error-correcting resource, and use the best-matched error-correcting resource to perform error correction for the first speech recognition result.

When the editing distance is calculated, the editing distance is 1 with regards to both the adding operation and the deleting operation; a pronunciation distance between two syllables may be calculated with regard to the replacing operation. The closer the pronunciation distance is, the smaller the generated editing distance increase is.

Reference may be made to corresponding depictions in the aforesaid method embodiment for a specific workflow of the apparatus embodiment shown in FIG. 8. The workflow is not detailed any more.

Figure 9:
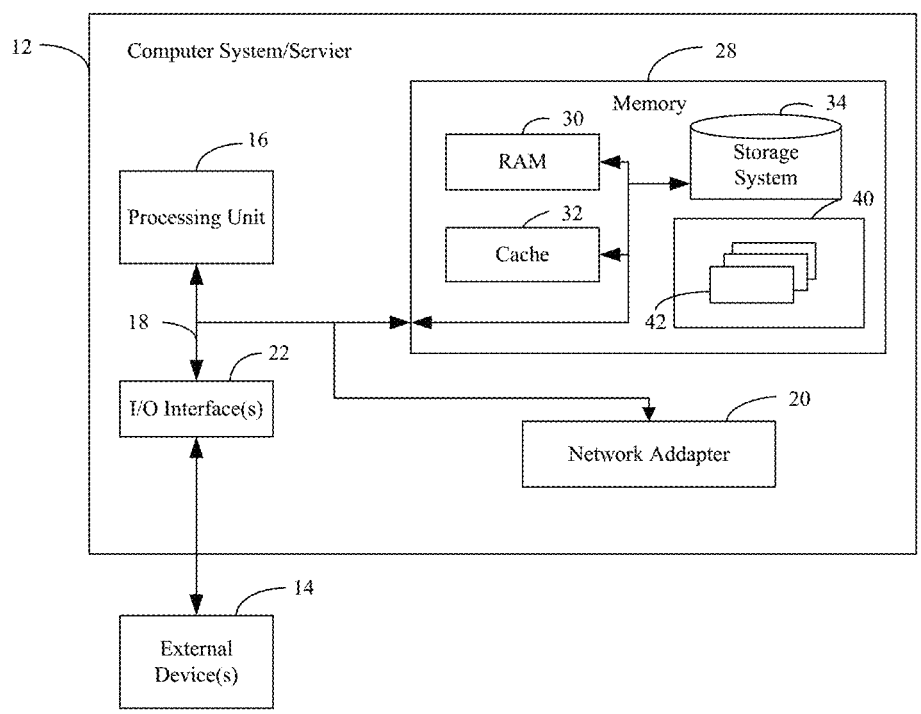
FIG. 9 is illustrates a block diagram of an example computer system/server 12 adapted to implement an implementation mode of the present disclosure.

FIG. 9 illustrates a block diagram of an example computer system/server 12 adapted to implement an implementation mode of the present disclosure. The computer system/server 12 shown in FIG. 9 is only an example and should not bring about any limitation to the function and scope of use of the embodiments of the present disclosure.

As shown in FIG. 9, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 9 and typically called a "hard drive"). Although not shown in FIG. 9, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 9, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiments shown in FIG. 1, namely, obtain a second speech recognition result of a second speech query input by the user, and perform error-correcting intention recognition according to the second speech recognition result; extract error-correcting information from the second speech recognition result if it is determined that the user has an error-correcting intention; screen error-correcting resources according to the error-correcting information, and use a selected best-matched error-correcting resource to perform error correction for the first speech recognition result, the first speech recognition result being a speech recognition result of a first speech query which is input before the second speech query.

Reference may be made to related depictions in the above embodiments for specific implementations, which will not be detailed any more.

The present disclosure meanwhile provides a computer-readable storage medium on which a computer program is stored, the program, when executed by the processor, implementing the method stated in the embodiment shown in FIG. 1.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for correcting a speech recognition error based on artificial intelligence, wherein the method comprises:

obtaining a second speech recognition result of a second speech query input by a user; performing error-correcting intention recognition according to the second speech recognition result;

extracting error-correcting information from the second speech recognition result when it is determined that the user has an error-correcting intention; screening each error-correcting resource according to the error-correcting information, and using a selected best-matched error-correcting resource to perform error correction for the first speech recognition result, the first speech recognition result being a speech recognition result of a first speech query which is input before the second speech query;

wherein when a type of an error-correcting resources are character-dividing resources, the method further comprises: with respect to each error-correcting resource, respectively converting each character in the error-correcting resource into a corresponding pinyin, and generating a key of the error-correcting resource according to each character and corresponding pinyin in the error-correcting resource;

establishing an inverted index between a key and a corresponding error-correcting resource;

the screening error-correcting resources according to the error-correcting information comprises:

converting each character in the error-correcting information into a corresponding pinyin; determining whether each character in the error-correcting information form a key, and if yes, regarding an error-correcting resource corresponding to the key as a selected error-correcting resource;

determining whether pinyin corresponding to each character in the error-correcting information form a key, and if yes, regarding an error-correcting resource corresponding to the key as a selected error-correcting resource;

wherein the generating a key of the error-correcting resource comprises:

regarding each character in the error-correcting resource, obtaining a continuous kgram set respectively by taking continuous i terms as a minimum granularity, and regarding pinyin corresponding to each character in the error-correcting resource, obtaining a continuous kgram set respectively by taking i terms as a minimum granularity, wherein i is a positive integer and $2 \leq i \leq N$, N being the number of characters included in the error-correcting resource;

regarding each character in the error-correcting resource, obtaining an uncontinuous skipping kgram set respectively by taking continuous j terms as a minimum granularity, and regarding pinyin corresponding to each character in the error-correcting resource, obtaining an uncontinous skipping kgram set respectively by taking j terms as a minimum granularity, wherein j is a positive integer and $2 \leq j \leq N-1$;

regarding elements in the continuous kgram sets and skipping kgram sets respectively as the keys of the error-correcting resource.

2. The method according to claim 1, wherein the performing error-correcting intention recognition according to the second speech recognition result comprises: determining whether the second speech recognition result matches at least one of M preset error-correcting intention templates, M being a positive integer; if yes, determining that the user has an error-correcting intention; if no, using a deep neural network model to perform intention classification for the second speech recognition result, the classification result including presence of an error-correcting intention and absence of an error-correcting intention.

3. The method according to claim 2, wherein the extracting error-correcting information from the second speech recognition result comprises: if it is determined that the user has an error-correcting intention by using the error-correcting intention template, determining the error-correcting information through slot information of the error-correcting intention template; if it is determined that the user has an error-correcting intention by using the deep neural network model, notating each character in the second speech recognition result through a sequence notation model, and using characters which are notated as belonging to error-correcting information to form the error-correcting information.

4. The method according to claim 1, wherein the using a selected best error-correcting resource to perform error correction for the first speech recognition result comprises:

regarding each of the screened-out error-correcting resources, respectively calculating a weighted editing distance between a character string formed by pinyin of each character in the error-correcting resource and a character string formed by pinyin of each character in the error-correcting information; considering an error-correcting resource with a minimum weighted editing distance obtained from the calculation, as the best-matched error-correcting resource, and using the best-matched error-correcting resource to perform error correction for the first speech recognition result.

5. The method according to claim 4, wherein the calculating a weighted editing distance comprises:

when an editing distance is calculated, the editing distance is 1 with regards to both an adding operation and a deleting operation; a pronunciation distance between two syllables is calculated with regard to a replacing operation; the closer the pronunciation distance is, the smaller the generated editing distance increase is.

6. A computer device, comprising a memory, a processor and a computer program which is stored on the memory and runs on the processor, wherein the processor, upon executing the program, implements the following operation: obtaining a second speech recognition result of a second speech query input by a user; performing error-correcting intention recognition according to the second speech recognition result; extracting error-correcting information from the second speech recognition result when it is determined that the user has an error-correcting intention; screening each error-correcting resource according to the error-correcting information, and using a selected best-matched error-correcting resource to perform error correction for the first speech recognition result, the first speech recognition result being a speech recognition result of a first speech query which is input before the second speech query;

wherein when a type of an error-correcting resources are character-dividing resources, the method further comprises:

with respect to each error-correcting resource, respectively converting each character in the error-correcting resource into a corresponding pinyin, and generating a key of the error-correcting resource according to each character and corresponding pinyin in the error-correcting resource:

establishing an inverted index between a key and a corresponding error-correcting resource;

the screening error-correcting resources according to the error-correcting information comprises: converting each character in the error-correcting information into a corresponding pinyin;

determining whether each character in the error-correcting information form a key, and if yes, regarding an error-correcting resource corresponding to the key as a selected error-correcting resource: determining whether pinyin corresponding to each character in the error-correcting information form a key, and if yes, regarding an error-correcting resource corresponding to the key as a selected error-correcting resource.

wherein the generating a key of the error-correcting resource comprises: regarding each character in the error-correcting resource, obtaining a continuous kgram set respectively by taking continuous i terms as a minimum granularity, and regarding pinyin corresponding to each character in the error-correcting resource, obtaining a continuous kgram set respectively by taking i terms as a minimum granularity, wherein i is a positive integer and 2≤I≤/V,N being the number of characters included in the error-correcting resource:

regarding each character in the error-correcting resource, obtaining an uncontinuous skipping kgram set respectively by taking continuous j terms as a minimum granularity, and regarding pinyin corresponding to each character in the error-correcting resource, obtaining an uncontinous skipping kgram set respectively by taking j terms as a minimum granularity, wherein j is a positive integer and 2 ≤j≤N-I;

regarding elements in the continuous kgram sets and skipping kgram sets respectively as the keys of the error-correcting resource.

7. The computer device according to claim 6, wherein the performing error-correcting intention recognition according to the second speech recognition result comprises: determining whether the second speech recognition result matches at least one of M preset error-correcting intention templates, M being a positive integer; if yes, determining that the user has an error-correcting intention;

if no, using a deep neural network model to perform intention classification for the second speech recognition result, the classification result including presence of an error-correcting intention and absence of an error-correcting intention.

8. The computer device according to claim 7, wherein the extracting error-correcting information from the second speech recognition result comprises:

if it is determined that the user has an error-correcting intention by using the error-correcting intention template, determining the error-correcting information through slot information of the error-correcting intention template;

if it is determined that the user has an error-correcting intention by using the deep neural network model, notating each character in the second speech recognition result through a sequence notation model, and using characters which are notated as belonging to error-correcting information to form the error-correcting information.

9. The computer device according to claim 6, wherein the using a selected best-matched error-correcting resource to perform error correction for the first speech recognition result comprises: regarding each of the screened-out error-correcting resources, respectively calculating a weighted editing distance between a character string formed by pinyin of each character in the error-correcting resource and a character string formed by pinyin of each character in the error-correcting information; considering an error-correcting resource with a minimum weighted editing distance obtained from the calculation, as the best-matched error-correcting resource, and using the best-matched error-correcting resource to perform error correction for the first speech recognition result.

10. The computer device according to claim 9, wherein the calculating a weighted editing distance comprises: when an editing distance is calculated, the editing distance is 1 with regards to both an adding operation and a deleting operation; a pronunciation distance between two syllables is calculated with regard to a replacing operation; the closer the pronunciation distance is, the smaller the generated editing distance increase is.

11. A Non-Transitory computer-readable storage medium on which a computer program is stored, wherein the program, when executed by a processor, implements the following operation:

obtaining a second speech recognition result of a second speech query input by a user; performing error-correcting intention recognition according to the second speech recognition result;

extracting error-correcting information from the second speech recognition result when it is determined that the user has an error-correcting intention;

screening each error-correcting resource according to the error-correcting information, and using a selected best-matched error-correcting resource to perform error correction for the first speech recognition result, the first speech recognition result being a speech recognition result of a first speech query which is input before the second speech query;

wherein when a type of an error-correcting resources are character-dividing resources, the method further comprises: with respect to each error-correcting resource, respectively converting each character in the error-correcting resource into a corresponding pinyin, and generating a key of the error-correcting resource according to each character and corresponding pinyin in the error-correcting resource; establishing an inverted index between a key and a corresponding error-correcting resource; the screening error-correcting resources according to the error-correcting information comprises: converting each character in the error-correcting information into a corresponding pinyin; determining whether each character in the error-correcting information form a key, and if yes, regarding an error-correcting resource corresponding to the key as a selected error-correcting resource; determining whether pinyin corresponding to each character in the error-correcting information form a key, and if yes, regarding an error-correcting resource corresponding to the key as a selected error-correcting resource;

wherein the generating a key of the error-correcting resource comprises: regarding each character in the error-correcting resource, obtaining a continuous kgram set respectively by taking continuous i terms as a minimum granularity, and regarding pinyin corresponding to each character in the error-correcting resource, obtaining a continuous kgram set respectively by taking i terms as a minimum granularity, wherein i is a positive integer and $2 \leq i \leq N$, N being the number of characters included in the error-correcting resource;

regarding each character in the error-correcting resource, obtaining an uncontinuous skipping kgram set respectively by taking continuous j terms as a minimum granularity, and regarding pinyin corresponding to each character in the error-correcting resource, obtaining an uncontinous skipping kgram set respectively by taking j terms as a minimum granularity, wherein i is a positive integer and $2 \leq j \leq N-1$;

regarding elements in the continuous kgram sets and skipping kgram sets respectively as the keys of the error-correcting resource.

12. The computer-readable storage medium according to claim 11, wherein the performing error-correcting intention recognition according to the second speech recognition result comprises: determining whether the second speech recognition result matches at least one of M preset error-correcting intention templates, M being a positive integer; if yes, determining that the user has an error-correcting intention; if no, using a deep neural network model to perform intention classification for the second speech recognition result, the classification result including presence of an error-correcting intention and absence of an error-correcting intention.

13. The computer-readable storage medium according to claim 12, wherein the extracting error-correcting information from the second speech recognition result comprises: if it is determined that the user has an error-correcting intention by using the error-correcting intention template, determining the error-correcting information through slot information of the error-correcting intention template; if it is determined that the user has an error-correcting intention by using the deep neural network model, notating each character in the second speech recognition result through a sequence notation model, and using characters which are notated as belonging to error-correcting information to form the error-correcting information.

14. The computer-readable storage medium according to claim 13, wherein the using a selected best-matched error-correcting resource to perform error correction for the first speech recognition result comprises: regarding each of the screened-out error-correcting resources, respectively calculating a weighted editing distance between a character string formed by pinyin of each character in the error-correcting resource and a character string formed by pinyin of each character in the error-correcting information; considering an error-correcting resource with a minimum weighted editing distance obtained from the calculation, as the best-matched error- correcting resource, and using the best-matched error-correcting resource to perform error correction for the first speech recognition result.

15. The computer-readable storage medium according to claim 14, wherein the calculating a weighted editing distance comprises: when an editing distance is calculated, the editing distance is 1 with regards to both an adding operation and a deleting operation; a pronunciation distance between two syllables is calculated with regard to a replacing operation; the closer the pronunciation distance is, the smaller the generated editing distance increase is.

* * * * *

UNITED STATES PATENT AND TRADEMARK OFFICE
CERTIFICATE OF CORRECTION

PATENT NO. : 10,699,696 B2
APPLICATION NO. : 15/986273
DATED : June 30, 2020
INVENTOR(S) : Hehan Li et al.

Page 1 of 1

It is certified that error appears in the above-identified patent and that said Letters Patent is hereby corrected as shown below:

In the Claims

Column 19, Line 62, Claim 1:
After "wherein i is a positive integer and"
Delete "2 <i< /V" and
Insert -- $2 \leq i \leq N$ --

Column 21, Line 38, Claim 6:
After "wherein i is a positive integer and"
Delete "2 ≤I ≤ /V" and
Insert -- $2 \leq i \leq N$ --

Column 23, Line 25, Claim 11:
After "j terms as a minimum granularity, wherein"
Delete "i is a positive integer and 2 ≤ j≤ TV—1" and
Insert -- j is a positive integer and $2 \leq j \leq N-1$; --

Signed and Sealed this
Twenty-ninth Day of December, 2020

Andrei Iancu
*Director of the United States Patent and Trademark Office*